United States Patent [19]
Menjo

[11] Patent Number: 5,610,698
[45] Date of Patent: Mar. 11, 1997

[54] IMAGE FORMING APPARATUS FOR INVERTING AN ORIGINAL TO RECORD BOTH SURFACES ON SEPARATE RECORDING MATERIALS

[75] Inventor: Takeshi Menjo, Tokyo, Japan

[73] Assignee: Canon Kabushiki Kaisha, Tokyo, Japan

[21] Appl. No.: 359,812

[22] Filed: Dec. 20, 1994

[30] Foreign Application Priority Data

Dec. 22, 1993 [JP] Japan ................................ 5-345650

[51] Int. Cl.⁶ ............................................ G03G 15/14
[52] U.S. Cl. ........................................ 399/367; 399/367
[58] Field of Search ........................... 355/271, 274, 355/319–321, 326 R, 327

[56] References Cited

U.S. PATENT DOCUMENTS

| | | | |
|---|---|---|---|
| 4,712,906 | 12/1987 | Bothner et al. | 355/271 |
| 4,912,515 | 3/1990 | Amemiya et al. | 355/274 |
| 4,914,737 | 4/1990 | Amemiya et al. | 355/276 |
| 5,086,318 | 2/1992 | Takeda et al. | 355/271 |
| 5,383,012 | 1/1995 | Yamada | 355/326 R |
| 5,406,358 | 4/1995 | Kimura et al. | 355/271 |
| 5,414,501 | 5/1995 | Miura et al. | 355/271 |
| 5,440,380 | 8/1995 | Takeda | 355/271 |

*Primary Examiner*—William J. Royer
*Attorney, Agent, or Firm*—Fitzpatrick, Cella, Harper & Scinto

[57] ABSTRACT

An image forming apparatus includes a movable recording material carrying member for carrying at least first and second recording materials thereon at the same time, a light irradiating device for irradiating an original, an image forming device for forming images on the recording materials at an image forming position in conformity with images of an irradiated original, the image forming device being capable of forming images on the recording materials carried to the image forming position a plurality of times, and an inverting device for inverting the original so that both surfaces of the original are irradiated with light so that an image on the first surface of the original is formed on one surface of the first recording material and an image on the second surface of the original is formed on one surface of the second recording material.

6 Claims, 7 Drawing Sheets

[UNIT μA]

| | N-th ROTATION | EMBODIMENT-10 | EMBODIMENT-11 | A |
|---|---|---|---|---|
| FRONT FACE TRANSFER | 1st COLOR | 100 | 100 | 200 |
| | 2nd COLOR | 150 | 150 | 250 |
| | 3rd COLOR | 200 | 200 | 300 |
| | 4th COLOR | 250 | 250 | 350 |
| REAR FACE TRANSFER | 1st COLOR | 200 | 100 | 300 |
| | 2nd COLOR | 250 | 150 | 350 |
| | 3rd COLOR | 300 | 200 | 400 |
| | 4th COLOR | 350 | 250 | 450 |
| IDLE ROTATION | 1 | 200 | 350 | 350 |
| | 2 | ELECTRICITY REMOVAL | | |

IMAGE FORMING APPARATUS FOR INVERTING AN ORIGINAL TO RECORD BOTH SURFACES ON SEPARATE RECORDING MATERIALS

BACKGROUND OF THE INVENTION

1. Field of the Invention

This invention relates to an image forming apparatus such as an electrophotographic apparatus or an electrostatic recording apparatus, and particularly to an image forming apparatus capable of recording images on a plurality of recording materials carried on a recording material carrying member.

2. Description of the Related Art

It is known to use a transfer drum as a recording material carrying member in an image forming apparatus such as a color electrophotographic apparatus. Toner images of a plurality of colors are successively transferred in superposed relationship with one another from a photosensitive member to a recording material carried on the transfer drum. U.S. Pat. No. 5,086,318 discloses that in an image forming apparatus provided with such a transfer drum, a plurality of recording materials are carried on the transfer drum at one time and image formation is effected on the plurality of recording materials to thereby improve productivity.

However, when a plurality of originals are to be copied or when an original having images on both surfaces thereof is to be copied, the originals have been placed one by one or the original has been placed with its surfaces alternated, on an original supporting table. Accordingly, in such a case, a plurality of recording materials cannot be carried on the transfer drum at one time and this results in a reduction in productivity.

SUMMARY OF THE INVENTION

It is an object of the present invention to provide an image forming apparatus which is improved in productivity.

It is another object of the present invention to provide an image forming apparatus for efficiently forming images from a plurality of originals onto a plurality of recording materials by the use of a recording material carrying member.

It is still another object of the present invention to provide an image forming apparatus for efficiently forming images from an original having images on both surfaces thereof onto a plurality of recording materials by the use of a recording material carrying member.

Further objects and features of the present invention will become apparent from the following detailed description taken in conjunction with the accompanying drawings.

DESCRIPTION OF THE PREFERRED EMBODIMENTS

The image forming apparatus of the present invention will hereinafter be described with reference to the drawings.

Figure 6:
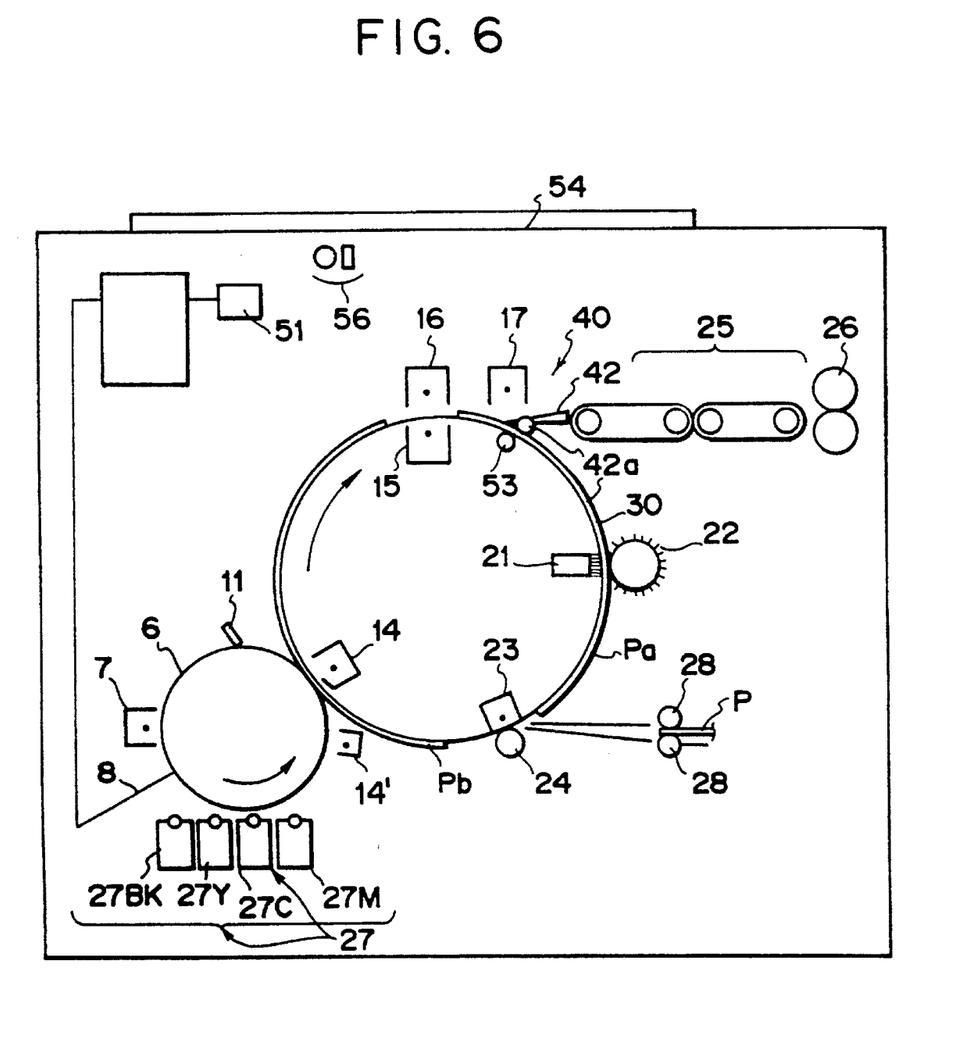
FIG. 6 is a schematic side view of a color image forming apparatus according to an embodiment of the present invention.

FIG. 6 shows a side view of a color electrophotographic apparatus as an embodiment of the image forming apparatus.

The surface of a cylindrical image bearing member (electrophotographic photosensitive member) 6 extending in a direction perpendicular to the plane of the drawing sheet of FIG. 6 and rotatable in the direction of the arrow is uniformly charged by a primary charger 7 and an optical image 8 based on an image signal is projected to the charged surface, whereby an electrostatic latent image is formed. This latent image is developed by a toner and when the toner image comes to a transfer region in proximity to which a transfer drum 30 is disposed, it is transferred to a transfer material supported on the transfer drum 30 by the action of a transfer charger 14, whereafter the transfer material is separated from the transfer drum and is discharged out of the apparatus via a fixating device 26. The photosensitive member 6 and the transfer drum 30 are rotated at a process speed of 160 mm/sec.

Such an image forming process will hereinafter be described in detail with respect to the case of color image formation. Magenta component light from a color original placed on the top of the image forming apparatus body is projected onto the image bearing member as indicated by reference numeral 8, and an electrostatic latent image for magenta component color is formed on the charged surface pre-formed by the primary charger 7. The original placed on an original supporting table 54 is optically scanned and the image information of the original is read by a CCD. On the basis of this image information, the photosensitive member is image-exposed by a laser scanner 51.

When, by the rotation of the image bearing member 6, this latent image arrives at a developing region in which a developing device 27 is opposedly disposed, the developing device 27 having developing devices 27M, 27C, 27Y and 27Bk containing therein magenta toner, cyan toner, yellow toner and black toner, respectively, has been positioned by this time so that the developing device 27M lies in the developing region, and supplies the magenta toner to the latent image for magenta component color which has come to this position, whereby a magenta toner image is formed.

When the image bearing member 6 is further rotated, the magenta toner image arrives at a transfer region comprising the image bearing member 6 and the transfer drum 30 disposed in proximity thereto. When a transfer material P is supplied from a cassette (not shown) or the like to the transfer drum 30 via a pair of register rollers 28, the transfer material passes an adsorption charger 23 disposed at this position and a grounded electrode (adsorption roller) 24 opposed thereto and is adsorbed to and supported on the transfer drum 30 and is rotated therewith, thus arriving at the transfer region.

At this time, a transfer bias is applied to the transfer charger 14, and by the action of an electric field formed thereby, the magenta toner image on the image bearing member 6 is transferred to the transfer material P.

Thereafter, the transfer material P is rotated while remaining supported on the transfer drum 30 and again comes to the transfer region. By this time, the formation of a latent image for the cyan component color of the original onto the image bearing member 6 and the formation of a cyan toner image by the cyan toner being imparted to the latent image with the developing device 27C having been moved to the developing region by the time the latent image arrives at the developing region have been effected, and this cyan toner image arrives at the transfer region. Accordingly, at this time, as in the aforedescribed case, transfer is effected and the cyan toner image is superposed and transferred onto the magenta toner image on the transfer material. Thereafter, the transfer material is further rotated while remaining supported on the transfer drum 30, and each time it arrives at the transfer region, a yellow toner image and a black toner image are successively superposed and transferred, thus terminating the transfer process.

When the transfer material P comes close to a separating region provided with a separating pawl 42 after the transfer process has been terminated, the transfer material has had its electricity removed by separating chargers 15 and 16 by this time, and in the separating region, the separating pawl 42 approaches the surface of the transfer drum 30, peels off the leading end of the transfer material from the transfer drum 30 and conveys the transfer material to the fixating device 26 via a conveyance path 25. After the transfer, any residual toners on the image bearing member 6 are removed by a cleaning blade 11.

The reference numeral 22 designates a cleaning member comprising a fur brush or the like, and the reference numeral 21 denotes a pack-up member. These members are adapted to be in their retracted positions spaced apart from the transfer drum 30 with the opposed electrode 24 of the adsorption charger 23 when the transfer material is being rotated with the transfer drum 30, thereby assuming positions which do not hinder the image transfer and the unfixated image on the transfer material, and at a point of time whereat the transfer material becomes absent from the transfer drum, they return to positions in which they effect cleaning or can accept the next transfer material onto the transfer drum.

Figure 7:
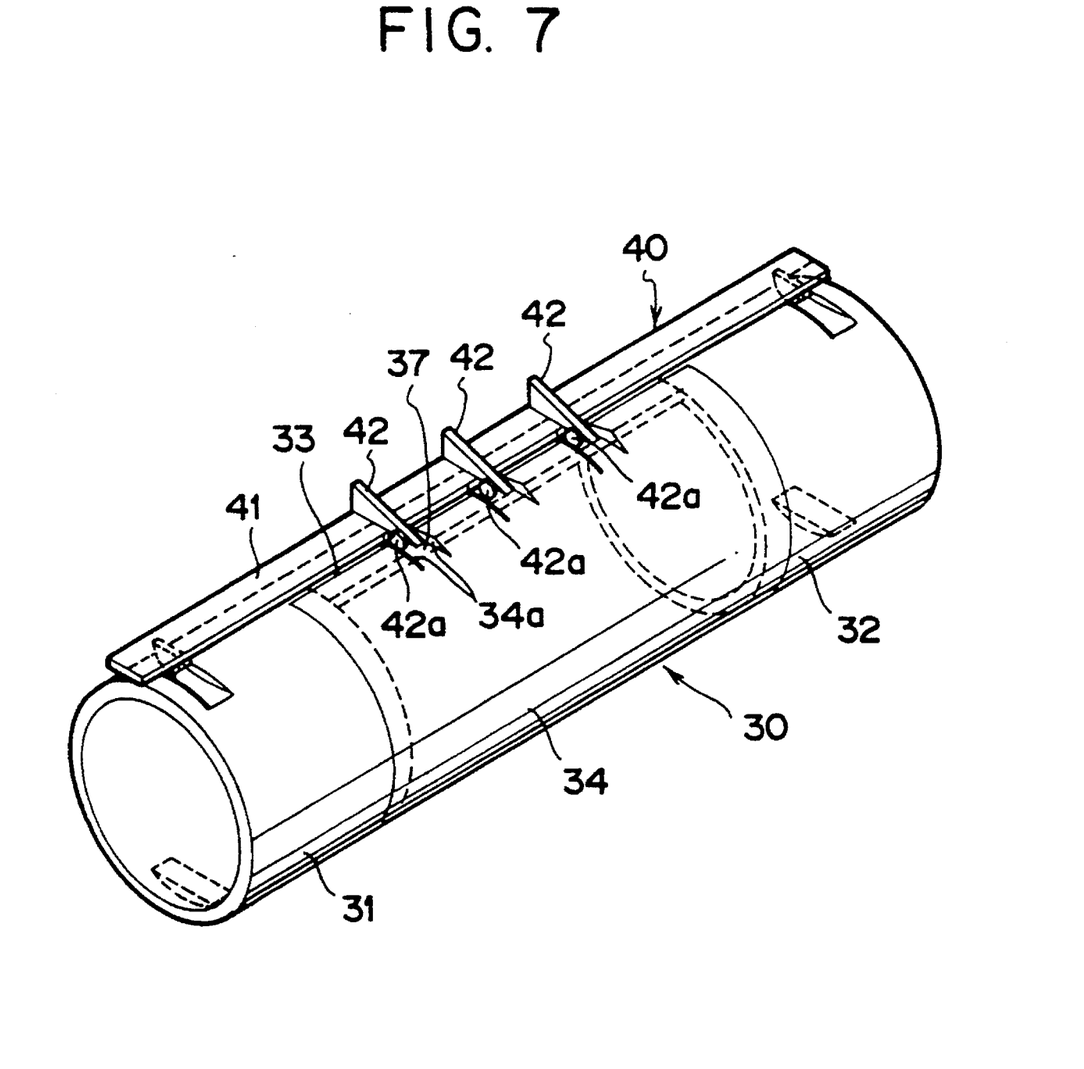
FIG. 7 is a perspective view showing the construction of the transfer drum.

The constructions of the transfer drum and separating pawl will now be described briefly.

Referring to FIG. 7 which is a perspective view showing the construction of the transfer drum 30, the transfer drum 30 is provided with a pair of ring members 31 and 32 disposed at a suitable interval and connected together by a connecting member 33 of a narrow width, and is constructed by a sheet 34 formed of a dielectric material being spread along the outer periphery of the drum. The outer diameter of the transfer drum 30 is 160 mm which is two or more times the length of the shorter side of size A4 (298 mm×210 mm). Accordingly, two transfer materials of A4 size can be adsorbed to the transfer drum 30 at different positions by the adsorption charger 23 and adsorption roller 24.

A support member 41 is pivotably disposed in proximity and parallel to the transfer drum 30, and a plurality of (in the shown case, three) separating pawls 42 are provided on the support member 41 and are adapted to be moved toward and away from the surface of the transfer drum 30. Each separating pawl 42 has attached thereto a press roller 42a for separation.

As shown in FIG. 6, a roller 53 is disposed inside the transfer drum 30 in proximity to the press roller 42a and at a location somewhat deviated from the press roller 42a. Accordingly, when the separation pawls 42 approach the surface of the transfer drum 30 to peel off the transfer material from the transfer drum 30, the press rollers 42a press the flexible sheet 34 of dielectric material on the surface of the transfer drum, and the press rollers 42a and the roller 53 cooperate with each other to curve the sheet 34 of the transfer drum 30, thereby facilitating the separation of the transfer material.

A cut-away 37 is formed in that region of the connecting member 33 which corresponds to each separating pawl 42, and a break 34a is formed correspondingly to the cut-away 37, in the leading end portion of the sheet 34 of dielectric material which is at the position of the connecting member 33, and this portion is adapted to bear against the bottom of the cut-away 37.

Figure 9:
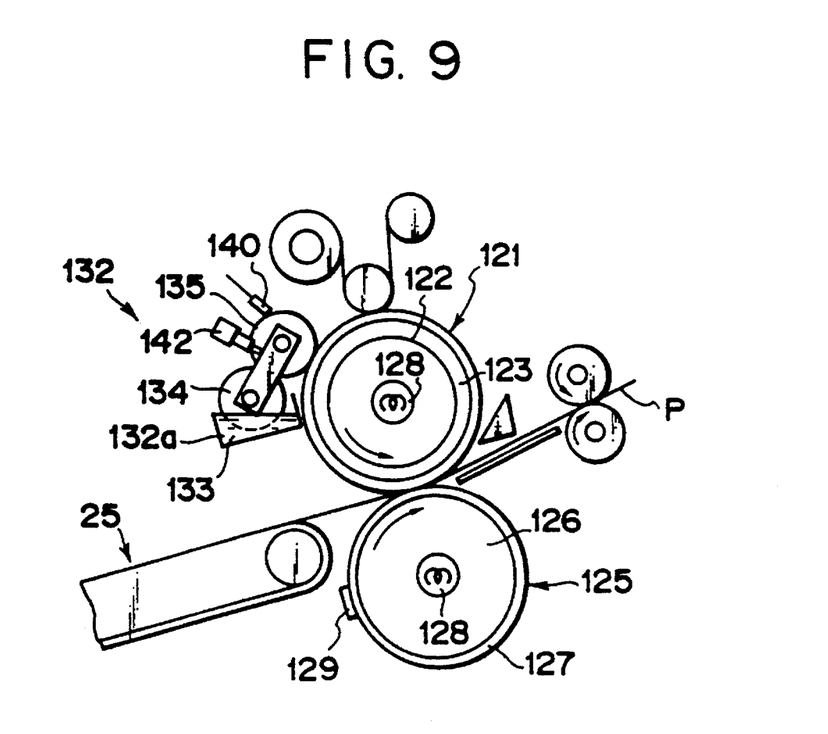
FIG. 9 is a side view of the essential portions of a fixating device for showing the construction thereof.

The fixating device will now be described briefly with reference to FIG. 9.

After the transfer has been terminated, the transfer material is supplied to the fixating device 26 via the conveyance path 25. The fixating device is provided with a fixating roller 121 and a pressing roller 125 urged against each other, and the transfer material passes through the nip between these two rollers.

The fixating roller 121 comprises a mandrel 122 of aluminum coated with an HTV silicone rubber (high temperature vulcanized silicone rubber) layer 123, and a layer of LTV silicone rubber (low temperature vulcanized silicone rubber) formed to a thickness on the order of 200 μm, and the pressing roller 125 comprises a mandrel 126 of aluminum coated with an HTV silicone rubber layer 127. In the shown case, a heat source 128 is disposed within each roller, whereby the surface temperature of each roller is maintained on the order of 17° C. The reference numeral 129 designates a thermistor for temperature control.

In order to improve the parting property of the fixating roller 121 and prevent an offset phenomenon, a parting agent applying device 132 is disposed near this roller. This device is provided with a container 132a containing therein a parting agent 133 such as silicone oil, and is adapted to apply an appropriate amount of parting agent to the fixating roller 121 by rollers 134 and 135 immersed in the parting agent 133, through the intermediary of a doctor blade 140. The reference numeral 142 denotes a solenoid adapted to move the roller 135 toward and away from the fixating roller 121 and select the supply or non-supply of the parting agent.

Figure 1:
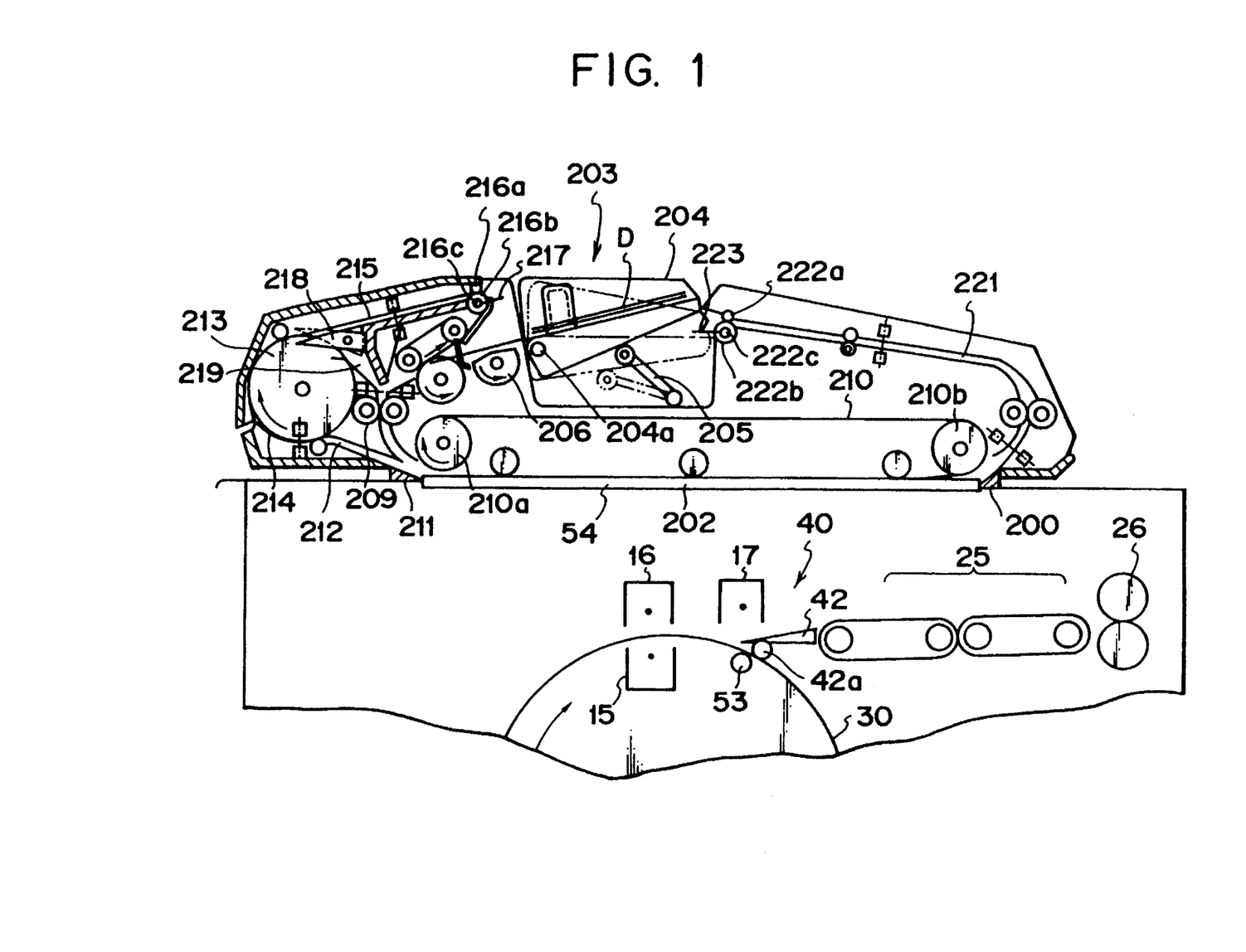
FIG. 1 is a side view of the essential portions of an image forming apparatus which is suitable for the present invention to be applied.

An automatic original feeding device placed on the image forming apparatus as shown in FIG. 6 to bring originals successively to an image forming position for applying light (a light applying position) will now be described briefly with reference to FIG. 1.

A pin 204a is pivotally mounted on the upper portion of the automatic original feeding device 203, and there is disposed a tray 204 serving as an original supporting table and an original discharging table vertically movable with the pin 204a as the center of pivotal movement by the pivotal movement of a link 205. The original D discharged from the tray 204 is wound on a pair of rollers 210a and 210b via a feed roller 206 and a pair of register rollers 209 and is conveyed to a predetermined location on the image forming apparatus by an endless belt 210 positioned at the original supporting region 54 of the image forming apparatus.

Also, on the left side of the original supporting table, a conveyance path 212 is provided via a jump 211 and conveyance paths 214 and 215 are provided around a roller 213 disposed downstream of the conveyance path 212, and discharge rollers 216a and 216b are provided at the end of the conveyance path 215, and an aligning member 217 is mounted on the shaft 216c of the roller 216b. A flapper 218 is disposed on the base of the conveyance path 215 and when in its solid-line position, it feeds the original toward the conveyance path 215, and when in its dotted-line position, it conveys the original conveyed thereto to the original supporting table via a conveyance path 219. When the original is to be conveyed to the original supporting table via the conveyance path 219, the original is reversed.

A conveyance path 221 is provided at the right end of the original supporting table via a jump 200, discharge rollers 222a and 222b are disposed at the left end thereof, and an original aligning member 223 is mounted on the shaft 222c of the roller 222b and thus, the original is placed on the tray 204 when the tray assumes its dotted-line position.

Description will now be made of obtaining one-side copies on two transfer materials from a both-surface original (an original having images formed on both surfaces thereof) by the use of the image forming apparatus, the automatic original feeding device, etc. described above. A both-surface original is conveyed from the automatic original feeding device to the original supporting table of the image forming apparatus, while on the other hand, two transfer materials are supplied to different locations on the transfer drum. The image on the front surface of the original is copied onto a first transfer material. The original on the original supporting table is reversed via the conveyance path 212, the flapper 218 and the conveyance path 219 and is again brought onto the original supporting table, whereafter the image on the back surface of the original is transferred to a second transfer material.

Description will hereinafter be made of an example in which as described above, an original having images formed on both surfaces thereof is copied onto a plurality of transfer materials.

Mode 1

Figure 8:
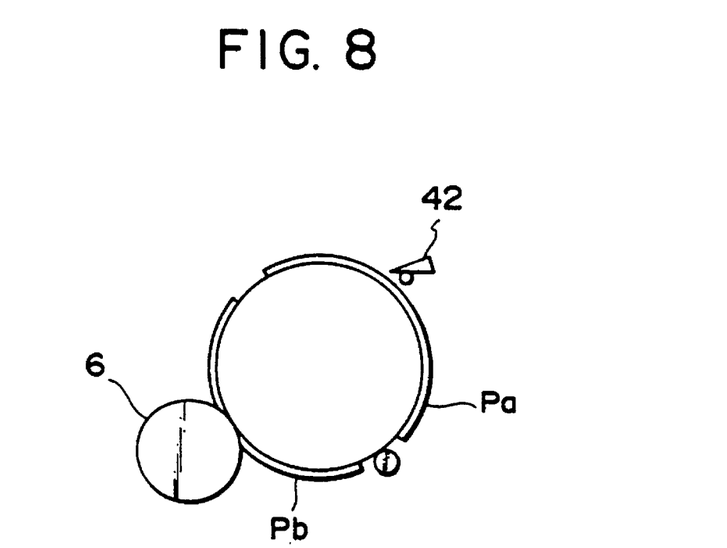
FIG. 8 is a side view showing the manner in which a transfer material is adsorbed to the transfer drum.

A both-surface original placed on the tray 204 is conveyed so that at first, the front surface thereof may come to the platen side. That is, the image on the front surface of the both-surface original is first irradiated with light and is read by a CCD. On the image forming apparatus side, two transfer materials Pa and Pb are continuously conveyed and are disposed on the transfer drum as shown in FIG. 8. The magenta image on the front surface of the original is first transferred to the transfer material Pa. The original is then reversed so that the image on the back surface thereof may come to the platen side, and the image on the back surface of the both-surface original is irradiated with light and is read by the CCD. The magenta image on the back surface of the original is transferred to the transfer material Pb.

Thereafter, cyan, yellow and black images are successively formed on the transfer materials Pa and Pb in a similar manner, whereafter the transfer materials Pa and Pb are continuously separated from the transfer drum which is a transfer material carrying member.

By such an image forming operation, the two transfer materials can be adsorbed onto the transfer material carrying member to thereby form images thereon at one time, and as compared with the conventional manner, copying can be done at an approximately double speed.

Mode 2

Description will now be made of a mode in which, for example, the front surface image and back surface image of a both-surface original are copied on each of three transfer materials.

The front surface image of the original is brought to the platen side and the transfer material carrying member is caused to carry two transfer materials thereon, and at first, the front surface image of the original is formed on these two transfer materials, and then the original is reversed, and the back surface image of the original is formed on two transfer materials fed subsequently. Thus, two sets of one-surface copies of the front surface and back surface of the original have been completed. Subsequently, by a technique similar to that in the aforedescribed mode 1, the original is reversed so as to correspond to the movement time from a transfer material Pa to a transfer material Pb on the transfer drum, whereby one set of one-surface copies are completed, thus terminating the operation.

Comparing this with the conventional technique, in the case of the conventional technique, two transfer materials for the front surface of an original are fed to the transfer material carrying member and image formation is effected, whereafter similar image formation is effected on another transfer material, and subsequently, an operation similar to that when the front surface of the original is copied is performed for the back surface image of the original to thereby obtain each of the three one-surface copies, and this is the only possible method in the conventional case, and a much longer time is required than in the operation as in the aforedescribed mode 2.

Mode 3

A both-surface original is placed on the tray 204 and two transfer materials are continuously fed and adsorbed to the transfer material carrying member.

The original is conveyed at the same speed as the process speed of the image forming apparatus so that the front surface image thereof may come to the platen side, and in a state in which the original reading device 56 does not perform its scanning operation but is stopped, the original reading device 56 reads the front surface image of the original conveyed thereto from its leading end to its trailing end. By this image signal, image formation is effected in the image forming apparatus portion as previously described. After the formation of the front surface image, the original is fed for the reversal thereof, and then is conveyed so that the back surface image thereof may come to the platen side. The conveyance speed at this time is the same as the process speed of the image forming apparatus, and with the original reading device 56 remaining stopped, it reads the back surface image from its leading end to its trailing end, and by this signal, image formation is thereafter effected as usual.

Such an image forming operation is performed for each of magenta, cyan, yellow and black toners, and the transfer materials are separated from the transfer materials carrying member, whereafter they are fixated to thereby obtain one-surface prints from the both-surface original.

By printing being effected in the manner as described above, the original can be read while it is fed from the original feeding device to the platen position and therefore, it becomes possible to shorten the time for setting the original on the platen. That is, according to the present embodiment, the original need not be placed on the platen. Thus, the time for the entire image forming operation can be shortened and also it becomes unnecessary to effect the reversal of the original at a high speed.

While one embodiment of the present invention has been described above as a color image forming apparatus in which two transfer materials of size A4 can be adsorbed to the transfer material carrying member, it can be readily understood that the present invention is not limited by the size of the transfer materials, the size of the transfer material carrying member, the process speed, etc., but the present invention can be applied to all cases where a plurality of transfer materials can be adsorbed to the transfer material carrying member, and is also effective for the case of a monochromatic system. Further, it is, of course, possible to once preserve the image of an original in an image memory and print out the image later.

Description will now be made of an embodiment in which a plurality of originals are conveyed one by one to a platen (an original supporting table) and are copied on a plurality of transfer materials.

As shown in FIG. 8, two transfer materials Pa and Pb are continuously fed to and supported on the transfer drum. As regards the operation of the apparatus, a first original a is fed from the tray 204 to the platen 202. A magenta image is then formed on the transfer material Pa. Subsequently, the original a is returned to the tray 204, and a second original b is brought to the platen 202 and a magenta image is formed on the transfer material Pb. Thereafter, likewise, the first original a and the second original b are successively and alternately placed on the platen 202 and with the rotation of the transfer drum, the formation of cyan, yellow and black toner images are effected.

After the formation of the images by all color toners is terminated, each transfer material is separated from the transfer drum, and then is discharged out of the apparatus via the fixating process. By two transfer materials being thus supported on the transfer drum and two originals on the automatic original feeding device side being suitably brought to the image forming position, it has become possible to obtain copies at an approximately double speed as compared with a case where image formation is effected on a transfer material supported on the transfer drum for each original.

Mode 4

Description will now be made of a case where monochromatic images are to be obtained. For example, a case where the copies of four originals a, b, c and d of monochromatic images are to be obtained will be shown by way of example. These originals are placed on the tray 204, and as shown in FIG. 8, two transfer materials Pa and Pb are supported on the transfer drum.

The original a is fed to the platen 202 and the image thereof is formed on the transfer material Pa. In this case, of course, a black toner is used as the toner. Subsequently, the original a is returned to the tray 204, and the original b is fed to the platen 202 and the image thereof is formed on the transfer material Pb on the transfer drum. These transfer materials Pa and Pb are then separated from the transfer drum, whereafter they are conveyed to the fixating device for heating and fixation.

After the transfer materials Pa and Pb have been separated from the transfer drum, new transfer materials Pc and Pd are adsorbed to and supported on the transfer drum, and in the same procedure as that for the originals a and b, the images of originals c and d on the tray are formed on the transfer materials Pc and Pd, and these transfer materials Pc and Pd are separated from the transfer drum, and thereafter are subjected to the fixation by the fixating device. By two transfer materials being thus supported at one time on the transfer drum which is a transfer material carrying member and corresponding originals being suitably brought afresh to the platen position, copies can be obtained at an approximately double speed as compared with a case where the image of an original is formed on a transfer material on a transfer drum.

Mode 5

Description will now be made of a case where monochromatic reduction printing is to be effected with three originals a, b and c of size A4 placed on the tray and with three transfer materials Pa, Pb and Pc of size A5 supported at one time on different locations on the transfer drum. As in the case of the aforedescribed mode 5, image formation is effected from the original a on the tray 204 onto the transfer material Pa, from the original b onto transfer material Pb and from the original c onto the transfer material Pc, whereafter hard copies are obtained via the separating and fixating steps.

By such an operation, hard copies are obtained at threefold efficiency as compared with the conventional case where each one transfer material is adsorbed to the transfer drum and image formation is effected discretely.

Description will now be made of an embodiment in which the original area on the original supporting table (platen) is divided into a plurality of areas and the image of an original is read and the divided plurality of areas are copied on a plurality of transfer materials. As the original, use is made, for example, of two originals like a spread of a book, and these originals are copied on two transfer materials.

Mode 6

For example, when two originals of size A4 are placed on the original supporting table and the full color copies thereof are to be made, two transfer materials Pa and Pb are supported on the transfer drum as shown in FIG. 8, and an image corresponding to the magenta component color of the original a is formed on the transfer material Pa, and then an image corresponding to the magenta component color of the original b is formed on the transfer material Pb. Further, an image corresponding to the cyan component color of the original a is formed on the transfer material Pa, and an image corresponding to the cyan component color of the original b is formed on the transfer material Pb, whereafter images of yellow and black component colors are formed on the transfer materials Pa and Pb, and then the transfer materials Pa and Pb are discharged out of the apparatus via the separating and fixating steps.

By such image formation being effected, hard copies can be obtained at an approximately double speed as compared with the conventional case where image formation is effected on each one transfer material.

Mode 7

Three originals a, b and c of size A5 are placed on the original supporting table and three transfer materials Pa, Pb and Pc of size A5 are supported on the transfer drum. At first, images of the magenta component color are continuously formed on all transfer materials, and subsequently images of the cyan, yellow and black component colors each are formed on all transfer materials, whereafter three hard copies are completed via the separating and fixating steps.

By such an operation, copies can be obtained at a threefold or higher speed as compared with a case where the image of an original is formed on a transfer material on the transfer drum and this is repeated three times.

Mode 8

Figure 2:
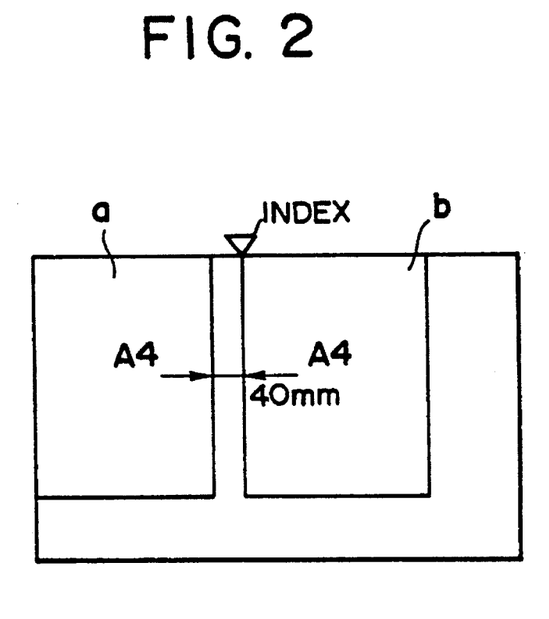
FIG. 2 is a plan view showing an original as it is placed on an original supporting table.
Figure 3:
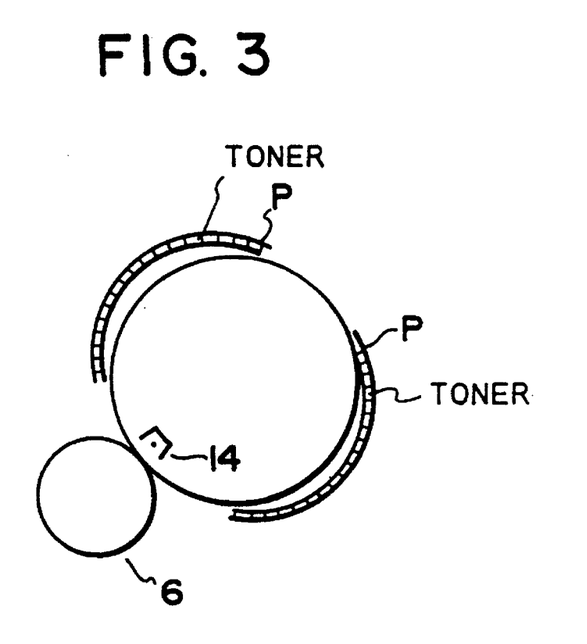
FIG. 3 is a side view showing a curled transfer material as it is adsorbed to a transfer drum.

For example, when two originals a and b of size A4 are placed on the original supporting table and two transfer materials are continuously adsorbed to the transfer drum and image formation is to be effected, the circumferential length of the transfer drum is set to 160 mm, the process speed (the speed of the photosensitive drum and the transfer drum) is set to 160 mm/sec., the interval between the two originals is set to 40 mm by the use of an index or the like, as shown in FIG. 2, and the transfer materials Pa and Pb on the transfer drum are supported also with an interval of 40 mm as shown in FIG. 3.

By such disposition, the originals a and b can be continuously read at the same speed as the process speed of 160 mm/sec. without the original image reading device including a CCD being stopped between the originals a and b.

In the case of the aforedescribed mode 6 and mode 7, the transfer materials on the transfer drum are fed and adsorbed at a predetermined sequence and therefore, the reading device is once stopped between the originals a and b in order that the timing for reading the original b may be adjusted to the transfer material b, while, according to the present embodiment, the copying speed during the formation of a plurality of copies can be increased and the sequence for once stopping the reading apparatus becomes unnecessary.

Mode 9

Originals a and b are arbitrarily disposed on the original supporting table and the interval between transfer materials Pa and Pb supported on the transfer drum is made equal to the interval between the originals. It is to be understood that the interval between the transfer materials is conformed to the interval between the originals during each copying operation. Also, by the originals and the transfer materials being disposed in such a relationship, as in the case of the aforedescribed mode 9, the copying operation can be continuously performed without the original image reading device being stopped.

In all of the above-described embodiments, the photosensitive member is image-exposed as shown below on the basis of the image information of the originals.

The image of an original is read by the original reading device 56 comprising a halogen lamp and a CCD (solid state image pickup element). The image signal of the original is converted into an electrical signal by such a CCD, and the electrical signal is transmitted to the printer unit (the image forming apparatus body). When the original is a colored original, an image signal color-resolved by red (R), blue (B) and green (G) filters is introduced into the CCD. Accordingly, such a color-resolved electrical signal is transmitted to the printer unit and on the basis of this electrical signal, a laser scanner image-exposes the photosensitive member.

Also, in all the above-described embodiments, the image forming apparatus can copy on both surfaces of a transfer material, and during both-surface copying, the separation of the transfer material is effected after the transfer to the front surface of the transfer material is terminated, thereby preventing the influence of curling.

Figure 4:
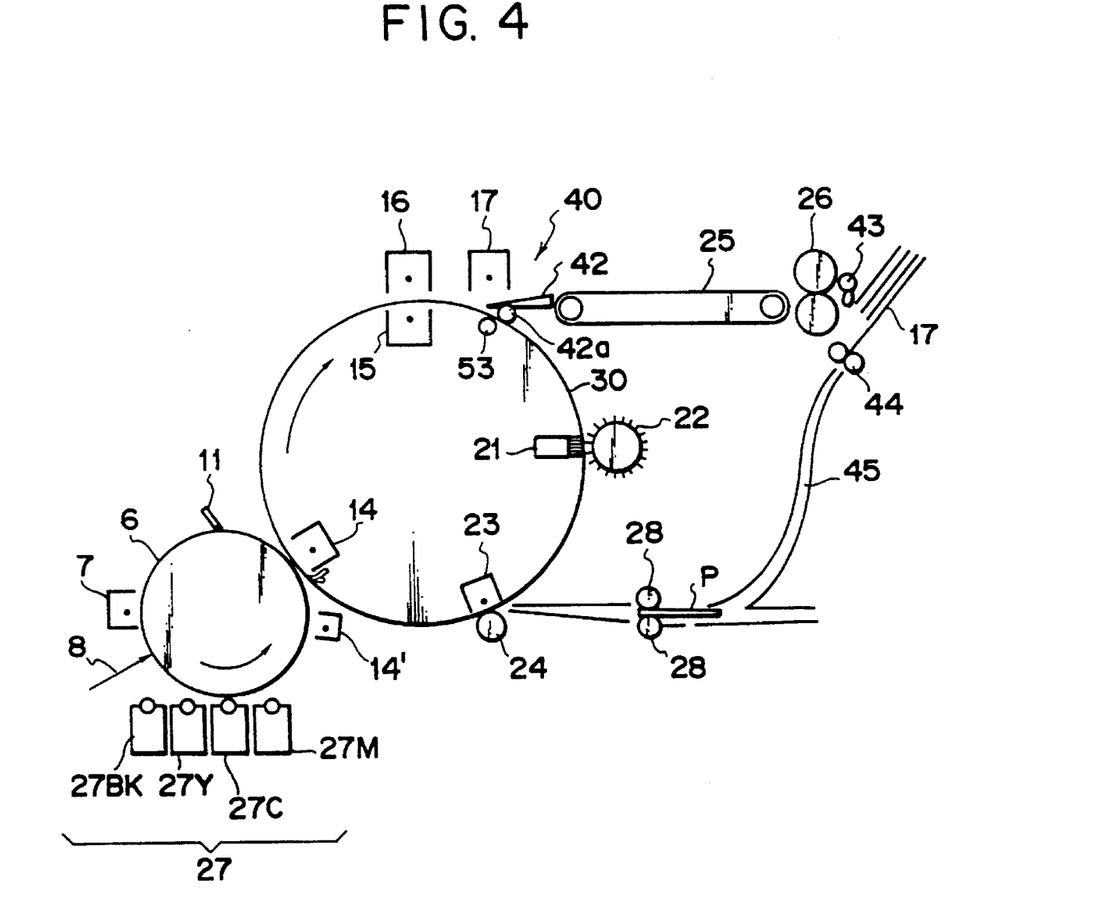
FIG. 4 is a schematic side view of a color image forming apparatus according to an embodiment of the present invention.

FIG. 4 is a side view schematically showing the construction of the image forming apparatus of the present embodiment. The manner in which copies are formed on the respective surfaces of transfer materials is similar to that in the apparatus shown in FIG. 6 and therefore need not be described.

In the apparatus of FIG. 4, a transfer material on the front surface of which image formation has been completed and which has been separated from a transfer drum 30 by separating means 40 has an image thereon fixated by a fixating device 26, whereafter it arrives at a paper discharge tray 17 via discharge rollers 43. This transfer material then passes re-feeding rollers 44 and a conveyance path 45 and again arrives at register rollers 28 and is further caught by the transfer drum 30, and image formation is effected on the back surface of the transfer material. After the termination of the image transfer, this transfer material is separated from the transfer drum by the separating means 40 and is discharged onto the paper discharge tray 17 via a conveyance path 25 and the fixating device 26 and thus, the operation is terminated.

Also, in this apparatus, a corona regulation member 14' is provided near a transfer charger 14. This member 14' comprises a support member of stainless steel and an insulating material such as Mylar attached thereto, and is adapted to bear against the inner surface of the transfer drum to thereby regulate the width of the corona charging area from the charger 14.

In the case of such an apparatus, when after the formation of an image on the back surface of the transfer material, electricity is removed from the leading end of the transfer material and the adsorbing action is released for the transfer material to be finally separated from the transfer drum, the transfer material becomes curled and the behavior of the transfer material affects even that portion of the transfer drum which is still effecting transfer at this time, thus creating transfer disturbance. FIG. 3 schematically shows this, that is, a state in which after an image has been formed on a first surface of the transfer material, the transfer material is carried on the transfer drum in order that an image may be formed on a second surface of the transfer material. When the transfer material becomes curled, the supporting of the transfer material becomes unstable. Description will hereinafter be made of an embodiment for avoiding such a problem.

Mode 10

In the apparatus shown in FIG. 4, after the termination of the transfer to the back surface of a both-surface copy, the separation of the transfer material is not immediately effected but the transfer drum is once idly rotated with the transfer material supported thereon, and the transfer material again passes the transfer region, whereafter a separating pawl 42 and a separating roller 42a are operated to effect separation. The operations of chargers 15, 16 and 17 which are electricity removing means in this case are similar to those in the prior art, but by the sequence being thus set, the trailing end of the transfer material does not effect the transferring operation when the leading end of the transfer material begins to be separated and therefore, the problem as noted above can be avoided reliably.

Accordingly, transfer disturbance, color misregistration, etc., which would otherwise be caused by the curling of the transfer material during separation can be prevented and images of good quality can be obtained. Both when one transfer material is adsorbed to the transfer drum and when two transfer materials are adsorbed to the transfer drum, the transfer drum is once idly rotated, whereby good images can be obtained as described above.

Mode 11

It is to be understood that after the transferring step has been terminated by the apparatus of FIG. 4, the transfer drum is twice idly rotated and during the first idle rotation, a stronger transfer current than during the transfer is supplied. After the adsorption force of the transfer material to the transfer drum has thus been once made stronger than during the transfer, electricity is removed from the transfer material during the second idle rotation, whereafter the transfer material is separated from the transfer drum. By doing so, the spaced state of the transfer material from the transfer drum caused by the curl created in the transfer material is suppressed by a strong electrostatic attracting force, whereby the creation of color misregistration and transfer disturbance during the transfer of the last color can be prevented.

Mode 12

It is to be understood that image formation is effected by the apparatus shown in FIG. 4 and as in the aforedescribed mode 10, the transfer drum is idly rotated after the transfer and that during this idle rotation, the corona regulation member 14' is gradually spaced apart from the inner surface of the transfer drum by suitable means such as a solenoid, not shown.

By doing so, the transfer material is prevented from being urged against the image bearing member 6 and the toners on the transfer material are prevented from shifting to the image bearing member to disturb the image thereon or reduce the density of the image, and the transfer material tends to separate from the image bearing member and therefore, after the transfer material has passed the transfer region, it is also prevented from being peeled off toward the image bearing member by the relation of curvature and the electrostatic force and the occurrence of a jam can also be prevented.

Figure 5:
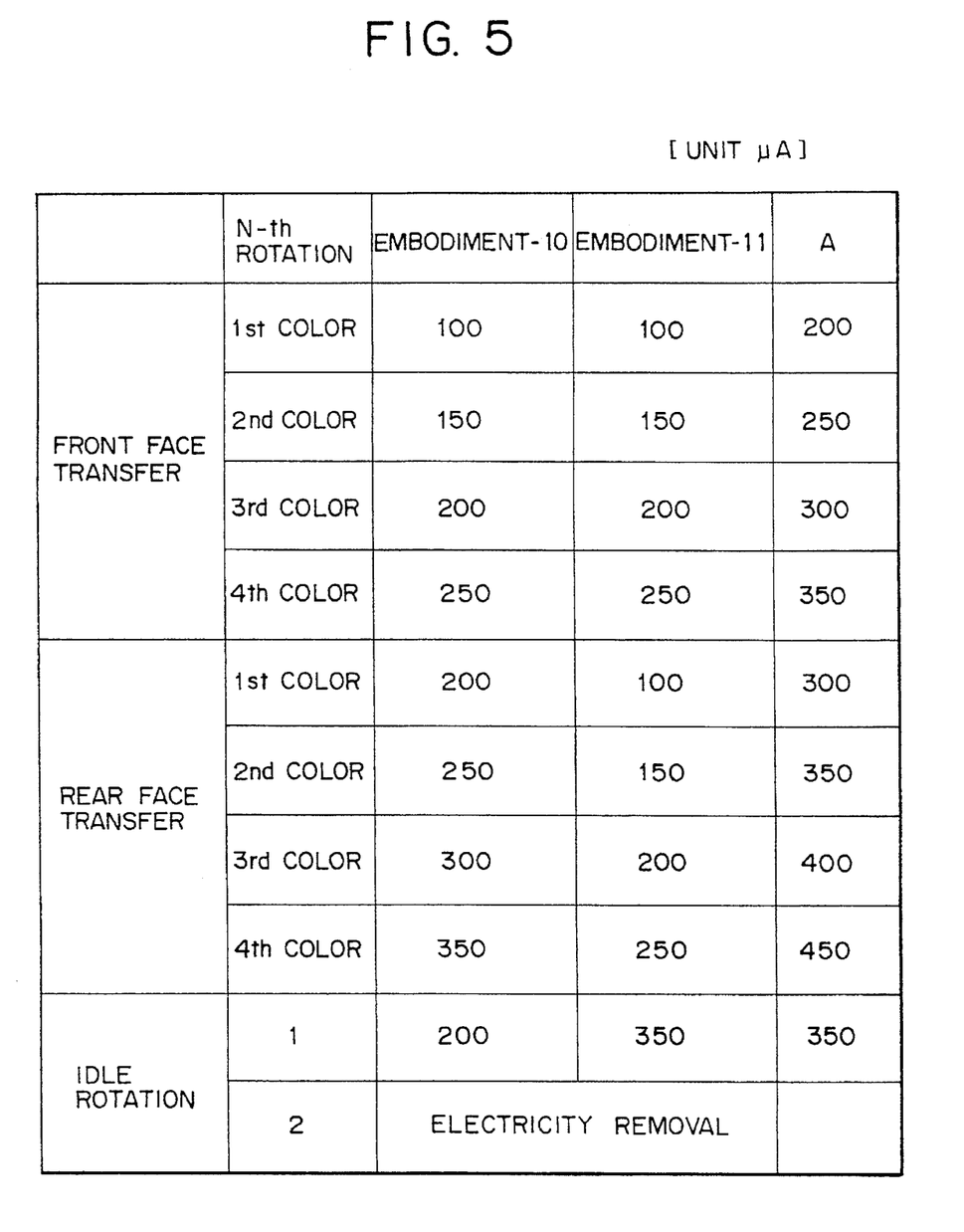
FIG. 5 is a table showing the manner in which a transfer current is sequentially increased to check the deterioration of the quality of an image caused by curl.

In effecting the transfer by this apparatus, image formation is effected in such a manner that as shown in FIG. 5, the transfer current is sequentially increased in both of the front surface transfer and the back surface transfer. In FIG. 5, the letter A indicates examples in which the transfer current has been increased when transfer efficiency has been reduced in a low-temperature and low-humidity environment. Of course, the transfer current should be varied depending on the image formation speed, the construction of the apparatus, etc.

The mode for copying a both-surface original onto a plurality of transfer materials as in modes 1 to 3, the mode for successively conveying a plurality of originals to the original supporting table and copying the originals onto a plurality of transfer materials as in modes 4 to 6, and the mode for copying the divided areas of an original onto a plurality of transfer materials as in modes 7 to 9 can be selected by the operator operating an operating panel. Also, if the transfer materials are of size A3, only one transfer material is carried on the transfer drum irrespective of one-sheet copying or plural-sheet copying.

As described above, when obtaining a plurality of one-surface copies from a both-surface original, it is possible to continuously effect image formation from the front and back surfaces of the original onto a plurality of transfer materials on the transfer material carrying member, thereby shortening the operation time greatly.

Also, in an image forming apparatus on the top surface of which is disposed an original feeding device containing a plurality of originals therein and in which the originals are successively fed from the original feeding device to a copying position, the originals are fed one by one onto an original supporting table or an original on the original supporting table is divided into a plurality of areas and a plurality of transfer materials are placed on the transfer drum so that image formation may be sequentially effected on these transfer materials and therefore, when a plurality of copies are to be obtained, the copying operation can be performed quickly and efficiently.

The present invention is not restricted to the above-described embodiments, but all modifications are possible within the scope of the technical idea of the invention.

What is claimed is:

1. An image forming apparatus comprising:

a movable recording material carrying member for carrying recording materials thereon, said carrying member being capable of carrying first and second recording materials thereon at the same time;

light irradiating means for irradiating an original;

image forming means for forming images on the recording materials carried on said recording material carrying member at an image forming position in conformity with images of an original irradiated by said light irradiating means, said image forming means being capable of forming images on the recording materials carried to said image forming position a plurality of times by said recording material carrying member; and inverting means for inverting the original so that both surfaces of the original are irradiated with light by said light irradiating means, whereby an image on the first surface of the original is formed on one surface of said first recording material and an image on the second surface of the original is formed on one surface of said second recording material.

2. The apparatus of claim 1, wherein for said apparatus to copy the first surface of a common original onto said first and second recording materials, and thereafter copy the second surface of said common original onto third and fourth recording materials, said recording material carrying member can carry said third and fourth recording materials thereon at the same time.

3. The apparatus of claim 1, further comprising reading means for reading the image of said original at a reading position, and conveying means for conveying the first surface and the second surface of said original successively to said reading position.

4. The apparatus of claim 3, wherein said reading means reads the images of said original being conveyed by said conveying means while remaining stopped.

5. The apparatus of claim 1, wherein said image forming means has an image bearing member, and the images on said image bearing member are transferred to the recording materials carried on said recording material carrying member.

6. The apparatus of claim 1, wherein said image forming means can form toner images of plural colors on the recording materials carried on said recording material carrying member.

\* \* \* \* \*

UNITED STATES PATENT AND TRADEMARK OFFICE
CERTIFICATE OF CORRECTION

PATENT NO. : 5,610,698
DATED : March 11, 1997
INVENTOR(S) : Takeshi MENJO

It is certified that error appears in the above-indentified patent and that said Letters Patent is hereby corrected as shown below:

<u>COLUMN 10</u>

Line 28, "Myler" should read --Mylar (trademark)--.

Signed and Sealed this

Ninth Day of September, 1997

Attest:

BRUCE LEHMAN

*Attesting Officer*  Commissioner of Patents and Trademarks